(12) United States Patent
Alcouffe

(10) Patent No.: US 7,778,357 B2
(45) Date of Patent: Aug. 17, 2010

(54) COFDM DEMODULATOR

(75) Inventor: Nicole Alcouffe, Grenoble (FR)

(73) Assignee: STMicroelectronics S.A., Montrouge (FR)

(*) Notice: Subject to any disclaimer, the term of this patent is extended or adjusted under 35 U.S.C. 154(b) by 539 days.

(21) Appl. No.: 11/076,698

(22) Filed: Mar. 10, 2005

(65) Prior Publication Data

US 2005/0201475 A1    Sep. 15, 2005

(30) Foreign Application Priority Data

Mar. 10, 2004    (FR)    .................................... 04 50484

(51) Int. Cl.
*H03K 9/00*    (2006.01)
*H04L 27/00*    (2006.01)

(52) U.S. Cl. ...................... 375/316; 375/260

(58) Field of Classification Search ................ 375/324, 375/340, 259–260, 316; 329/304–310
See application file for complete search history.

(56) References Cited

U.S. PATENT DOCUMENTS

| | | | |
|---|---|---|---|
| 6,452,917 B1 | 9/2002 | Leung | |
| 2002/0061076 A1* | 5/2002 | Seki et al. | 375/316 |
| 2002/0122381 A1* | 9/2002 | Wu et al. | 370/208 |
| 2002/0146078 A1 | 10/2002 | Gorokhov et al. | |
| 2003/0123582 A1* | 7/2003 | Kim et al. | 375/347 |
| 2003/0174686 A1* | 9/2003 | Willenegger et al. | 370/342 |
| 2004/0208138 A1* | 10/2004 | Hayashi et al. | 370/286 |
| 2005/0174929 A1* | 8/2005 | Hayashi et al. | 370/208 |

FOREIGN PATENT DOCUMENTS

EP    1 276 288 A1    1/2003

OTHER PUBLICATIONS

French Search Report from corresponding French Application No. 0459484, filed Mar. 10, 2004.
Hyuk Jun Oh, CIOFFI: *An Adaptive Channel Estimation Scheme for DS-CDMA systems*, IEEE Vehicular Technology Conference, vol. 6, Sep. 24, 2000, pp. 2839-2843, XP010525099, New York.

* cited by examiner

*Primary Examiner*—Shuwang Liu
*Assistant Examiner*—James M Perez
(74) *Attorney, Agent, or Firm*—Lisa K. Jorgenson; James H. Morris; Wolf, Greenfield & Sacks, P.C.

(57) ABSTRACT

A COFDM demodulator including a fast Fourier transform circuit receiving a signal on an information channel, the received signal corresponding to a sequence of symbols, each conveying several carriers, some of which are pilots, each carrier of a symbol being modulated in plase and/or in amplitude by a current complex coefficient, the fast Fourier transform circuit providing for each carrier the associated current complex coefficient; a circuit for determining an estimate of the frequency response of the information channel providing, for each pilot, a complex coefficient estimated based on the current complex coefficient associated with the pilot, and a circuit for determining the time variation of the frequency response of the information channel based on the estimated and current complex numbers associated with at least one pilot.

15 Claims, 3 Drawing Sheets

COFDM DEMODULATOR

BACKGROUND OF THE INVENTION

1. Field of the Invention

The present invention relates to a Coded Orthogonal Frequency Division Multiplex (COFDM) demodulator.

2. Discussion of the Related Art

FIG. 1 illustrates the principle of a COFDM modulation. Data packets to be transmitted are put in the form of N complex coefficients associated with N respective frequencies (or carriers). Number N of the frequencies is equal, for example, to 1,705 for the so-called "2K" mode and to 6,817 for the so-called "8K" mode, in digital television radio transmission. Each complex coefficient corresponds to a vector which is illustrated in FIG. 1 as starting from a frequency axis at a point indicating the frequency associated with the coefficient.

The set of these N coefficients is processed by inverse fast Fourier transform (IFFT), which generates a "symbol" formed of a sum of modulated carriers, each carrier having an amplitude and a phase determined by the associated complex coefficient. The symbol thus generated is transmitted.

Conventionally, in radio transmission, the width of the information channel is 6, 7, or 8 MHz and each carrier is separated from the next one by a frequency difference $\Delta f = 1/Tu$. Tu is the transmission time of a symbol and is called the operating lifetime. The operating lifetime is on the order of 224 μs in 2K mode and 896 μs in 8K mode, for a 8-MHz passband.

Upon reception, a receiver submits the symbol to the inverse processing, that is, mainly, a fast Fourier transform (FFT) to restore the initial complex coefficients.

The receiver actually receives the signal transmitted by the transmitter as well as a multitude of attenuated and delayed signals originating from different echoes. The information channel, taken by the signal to be demodulated, is then said to be a multiple-path channel. Such a channel has a frequency response which is not flat, but comprises holes and bumps due to the echoes and reflections between the transmitter and the receiver. The channel is said to be of fixed type when it has a frequency response which is substantially constant along time. Conversely, the channel is said to be of time-variable type when it has a frequency response which varies along time.

To determine an estimate of the frequency response of the information channel, regularly distributed vectors P1, P2, P3 . . . having a known constant value are used. These vectors, or the corresponding carriers, are said to be pilots. They are used to reflect the distortions undergone by the transmitted channel and by the information that they provide on the channel response, they enable correcting the unknown vectors located between pilots.

FIG. 2 schematically shows the place of pilots in the symbols. The symbols are gathered in frames of 68 symbols, conventionally in digital television radio transmission (standard ETSI EN 300 744, V1.4.1).

In FIG. 2, each line represents a symbol and each box represents the position of a carrier. The carriers are defined as going from a position 0 to a position Kmax, Kmax being equal to 1,704 in 2K mode and 6,816 in 8K mode. Indeed, a portion only of the possible frequencies is used, especially due to risks of losses at the channel border. The pilots are of two types.

On the one hand, there are, in each symbol, continuous pilots Pc. The continuous pilots correspond to specific frequencies distributed in the channel. In the above-mentioned ETSI standard, there are 45 of these in 2K mode and 177 in 8K mode. Continuous pilots are present in all the symbols and always occupy the same frequency position. In FIG. 2, only the continuous pilots corresponding to positions 0 and Kmax have been shown.

On the other hand, there are, in each symbol, so-called "scattered pilots" Pr, which are arranged every 12 carriers, and shifted by three positions between two successive symbols. Thus, every four symbols, the same arrangement of scattered pilots Pr can be found.

The continuous and scattered pilots, of constant amplitude on transmission, are used to know the frequency and pulse response of the channel. For this purpose, at the receiver, the complex time received signal, after having been put in baseband, is provided to a fast Fourier transform unit providing the symbol in the frequency field. The pilots are sampled from this symbol. An estimate of the frequency response of the channel is determined based on the continuous and scattered pilots sampled from four successive symbols. The estimate of the frequency response is especially used to correct the vectors associated with the carriers located between pilots. The pulse response of the channel, obtained from the inverse Fourier transform of the frequency response estimate, is especially used to finely position a window on which the fast Fourier transform is performed.

Many operating parameters of the COFDM demodulator are generally optimized on operation of the COFDM to improve the demodulator performance.

A method to adjust the operating parameters of the demodulator consists of analyzing the data received after complete decoding and determining bit error rate BER. The previously-described operating parameters of the demodulator can then be modified by trial and error until the bit error rate is acceptable.

Another criterion of the measurement of the demodulation quality corresponds to the signal-to-noise ratio SNR which can be determined on extraction of the continuous or scattered pilots.

Among the operating parameters of the demodulator that can be optimized, some depend on the fixed or time-variable type of the channel. For example, according to the nature of the channel, a specific method can be privileged to determine the channel frequency response, thus enabling more efficiently obtaining a precise estimate of the frequency response of the channel. Further, according to the channel type, the amplifier gains provided at the demodulator input may be set in adapted fashion to amplify the signal received by the demodulator. Further, before performing the fast Fourier transform, the complex signal is generally corrected in frequency and in time by algorithms implementing time constants that can be adjusted according to the type of channel.

However, the method for optimizing the operating parameters of the demodulator using bit error rate BER is relatively inaccurate and slow as concerns the operating parameters that can be optimized according to the type of information channel. Indeed, the complete data decoding must be awaited, which can be very long. A modification of the operating parameters of the demodulator based on such a criterion is thus performed long after a channel variation, and thus generally too late to avoid a data loss. Further, bit error rate BER does not indicate how the operating parameters of the demodulator are to be modified to improve its performances. Indeed, a proper adjustment of the operating parameters of the demodulator will only be acknowledged by a subsequent decrease in the bit error rate.

Like for bit error rate BER, it is not possible to deduce from signal-to-noise ratio SNR the reasons of the degradation of the demodulation. A parameter optimization method implementing signal-to-noise ratio SNR is thus slow and inaccurate since the operating parameters of the demodulator must thus be modified by trial and error until the signal-to-noise ratio is acceptable.

SUMMARY OF THE INVENTION

The present invention aims at a method and circuit, for a COFDM demodulator, providing an indicator enabling adjusting, in a fast and accurate manner, the operating parameters of the demodulator that can be optimized according to the fixed or time-variable type of the information channel.

According to another object, the present invention aims at a method and a circuit providing an indicator representative of the way in which the operating parameters of the demodulator, which can be optimized according to the fixed or time-variable type in the information channel, are adjusted.

To achieve this and other objects, the present invention provides a COFDM demodulator comprising a fast Fourier transform circuit receiving a signal on an information channel, the received signal corresponding to a sequence of symbols, each conveying several carriers, some of which are pilots, each carrier of a symbol being modulated in phase and/or in amplitude by a current complex coefficient, said fast Fourier transform circuit providing for each carrier the associated current complex coefficient; a circuit for determining an estimate of the frequency response of the information channel providing, for each pilot, a complex coefficient estimated based on the current complex coefficient associated with the pilot; and a circuit for determining the time variation of the frequency response of the information channel based on the estimated and current complex numbers associated with at least one pilot.

According to an embodiment of the present invention, the circuit for determining the frequency response estimate comprises a circuit for providing, for each pilot of a symbol, a differential complex coefficient obtained based on the difference between the current and estimated coefficients associated with the pilot.

According to an embodiment of the present invention, the circuit for determining the time variation of the frequency response of the information channel comprises a circuit for providing a first value representative of the modulus of the estimated complex coefficient associated with the pilot; a circuit for providing a second value representative of the modulus of the differential complex coefficient associated with the pilot; and a circuit for providing an instantaneous indicator of the time variation of the frequency response of the information channel for the pilot, corresponding to the ratio between the second value and the first value.

According to an embodiment of the present invention, the circuit for determining the time variation of the frequency response of the information channel comprises a circuit for determining the sum of the instantaneous indicators for all the pilots of a symbol.

According to an embodiment of the present invention, the circuit for determining the time variation of the frequency response of the information channel comprises a circuit for determining a mean indicator equal to the time average of the sum of the instantaneous indicators.

According to an embodiment of the present invention, the demodulator comprises a correction circuit receiving the mean indicator and modifying an operating parameter of the demodulator according to the mean indicator.

The present invention also provides a COFDM-type demodulation method comprising a step of fast Fourier transformation of a signal received from an information channel, the received signal corresponding to a sequence of symbols each carrying several carriers, some of which are pilots, each carrier of a symbol being modulated in phase and/or in amplitude by a current complex coefficient; a step for determining an estimate of the frequency response of the information channel based on the current complex coefficients associated with the pilots; and a step for determining the time variation of the frequency response of the information channel, comprising providing, for each pilot, a complex coefficient associated with the pilot based on the estimated complex coefficient associated with at least one pilot and on the current complex coefficient associated with the pilot.

According to an embodiment of the present invention, the step of determining the time variation of the frequency response of the information channel comprises the steps of providing a first value representative of the modulus of the estimated complex coefficient associated with the pilot; providing a second value representative of the modulus of a differential complex coefficient obtained from the difference between the current and estimated complex coefficients associated with the pilot; and providing an instantaneous indicator of the time variation of the frequency response of the information channel for the pilot, corresponding to the ratio between the second value and the first value.

According to an embodiment of the present invention, the step of determining the time variation of the frequency response of the information channel comprises the determination of the sum of the instantaneous indicators for all the pilots of a symbol.

According to an embodiment of the present invention, the step of determining the time variation of the frequency response of the information channel comprises the determination of the time average of the sum of the instantaneous indicators.

The foregoing object, features, and advantages, as well as others, of the present invention will be discussed in detail in the following non-limiting description of specific embodiments in connection with the accompanying drawings.

DETAILED DESCRIPTION

The present invention aims at providing, in quasi-instantaneous fashion, an indicator representative of the fixed or time-variable type of the information channel. This enables obtaining a fine demodulation since the adjustments of the operating parameters of the demodulator which depend on the information channel type can then be performed vary fast.

Figure 1:
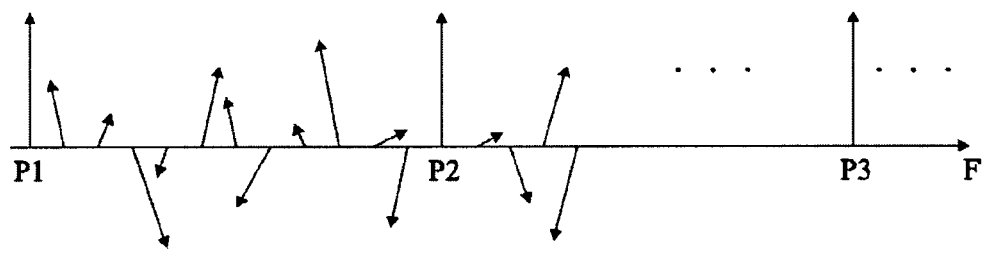
FIG. 1, previously described, shows phase- and amplitude-modulated carriers in a COFDM transmission system.
Figure 2:
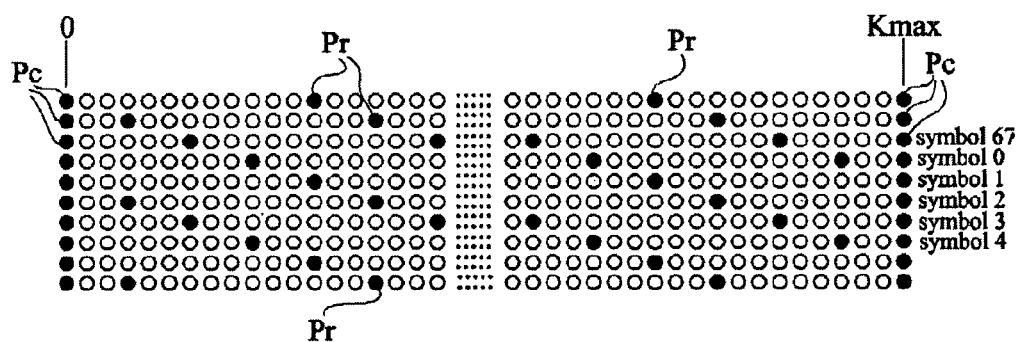
FIG. 2, previously described, schematically shows the position of pilots in symbols.
Figure 3:
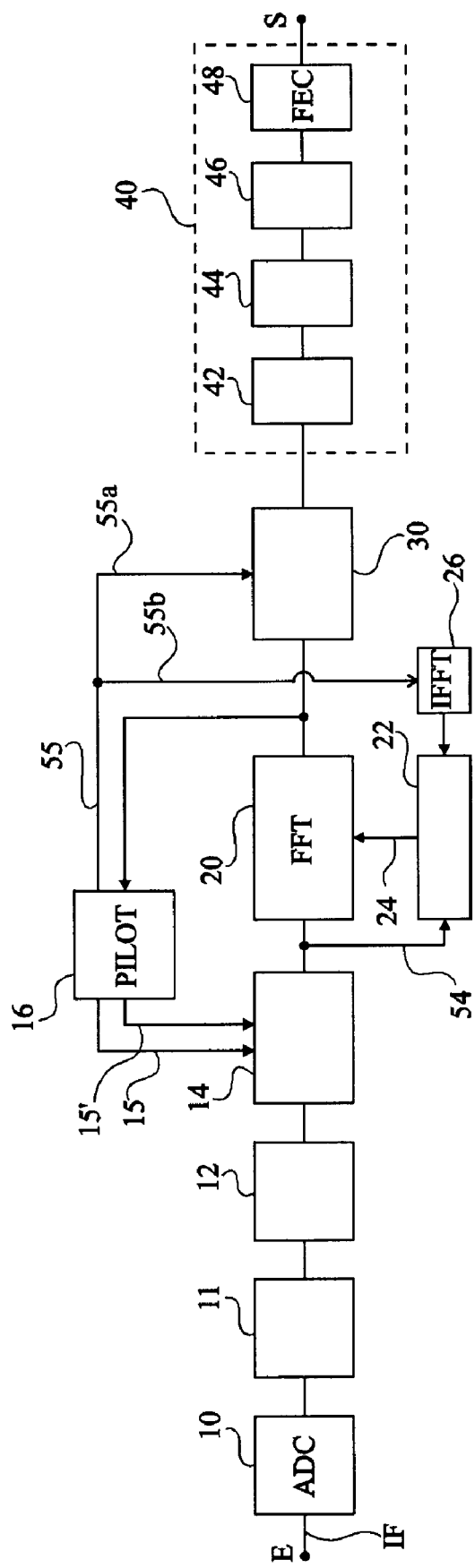
FIG. 3 shows an example of a demodulator according to the present invention.

FIG. 3 shows an example of a demodulator according to the present invention. The received signal especially comprises continuous pilots, scattered pilots, and data carriers.

In FIG. 3, an input E of the demodulator receives a signal IF of intermediary frequency enabling a sampling, for example, at 36 MHz. Signal IF corresponds to the signal received after various frequency changes or transpositions.

Input E is coupled to an analog-to-digital converter 10 (ADC) which digitizes input signal IF. Analog-to-digital converter 10 drives a unit 11 for suppressing pulse interferences. Unit 11 provides a signal corresponding to the signal provided by analog-to-digital converter 10 in which pulse interferences have been suppressed. Unit 11 drives a frequency change unit 12. Unit 12 provides a signal substantially in baseband, the signal spectrum at the output of unit 12 being centered on a frequency substantially equal to zero. Unit 12 is coupled to a unit 14, enabling on the one hand fine setting of the central frequency of the signal spectrum and, on the other hand, providing time samples at times appropriate to the subsequent processing. At the output of unit 14, the signal spectrum is centered on a frequency equal to 0 and the number and the time position of the samples are adapted to the transformation by Fourier transform which is performed in the next unit. Unit 14 is controlled by connections 15 and 15' connecting unit 14 to a unit 16 for processing the continuous and scattered pilots.

The output of unit 14 drives a fast Fourier transform unit 20 (FFT) which provides the frequencies corresponding to a symbol. Unit 20 is driven by a unit 22 which provides, via a connection 24, a signal for setting the analysis window of the Fourier transform.

The output of unit 20 is coupled to unit 16 which extracts and processes the continuous and scattered pilots. Unit 16 provides on connections 15 and 15' the signals intended to correct the central frequency of the spectrum and the sampling frequency of the signal.

The output of unit 20 drives a unit 30 in which the signal is connected by means of an estimate of the frequency response of the channel. The estimate of the channel frequency response is obtained in unit 16 by means of the pilots. This estimate is provided by unit 16 on a connection 55, having a branch 55a coupled to unit 30. At the output of unit 30, the signal especially comprises the corrected carriers conveying the data.

The estimate of the channel frequency response, provided by unit 16, supplies, via connection 55 and a branch 55b of connection 55, an inverse fast Fourier transform unit 26 (IFFT), to determine the channel pulse response. Unit 26 provides the channel pulse response to unit 22, to dynamically adjust the positioning of the FFT analysis window.

The processing of the carriers conveying the data is ensured in a data processing and provision circuit 40. Circuit 40 has a conventional structure and may comprise, as shown in FIG. 3, a symbol disinterlacing unit 42, a so-called "demapping" unit 44, a bit disinterlacing unit 46, and an error correction unit 48 (FEC). The output of unit 48 forms output S of circuit 40 and of the demodulator and provides data corresponding to the transmitted data.

Figure 4:
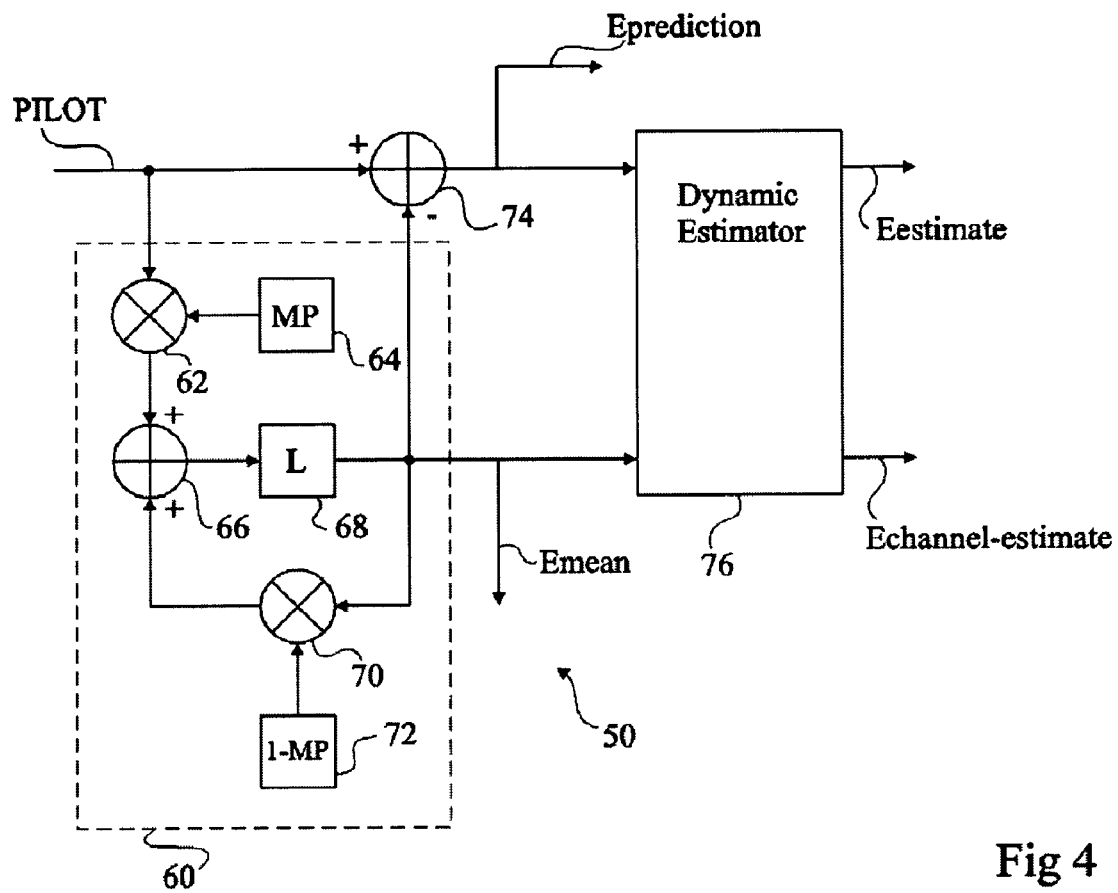
FIG. 4 shows an example of the forming of a portion of a unit for estimating the frequency response of an information channel according to the present invention.

FIG. 4 shows a more detailed example of the forming of a circuit 50 which corresponds to the portion of unit 16 relative to the determination of the estimate of the channel frequency response. Circuit 50 is used in integrated circuit STV0360E, available from STMicroelectronics. Circuit 50 is duplicated for each continuous and scattered pilot contained in a symbol and, for a considered pilot, circuit 50 is duplicated for the real part and for the imaginary part of the complex coefficient associated with the pilot. The operation of the different components of circuit 50 is synchronized by a clock signal, not shown.

Circuit 50 receives as an input a signal PILOT corresponding to the real part or to the imaginary part of the complex coefficient associated with a pilot extracted by another portion of unit 16, not shown. Circuit 50 comprises a circuit 60, also called a static estimator, which for example determines the time average of signal PILOT. As an example, signal PILOT is a digital signal coded over eight signed bits. Circuit 60 comprises a multiplication unit 62 receiving signal PILOT and the content of a memory 64 in which is stored a gain MP. Multiplication unit 62 provides signal PILOT multiplied by gain MP to a first input of an adder 66. The output signal of adder 66 is stored in a latch (L) 68. A multiplication unit 70 multiplies the content of latch 68 by a gain 1-MP stored in a memory 72. Multiplication unit 70 drives a second input of adder 66. Latch 68 provides a signal Emean corresponding to the time average of signal PILOT. Gains MP and 1-MP act as time constants for the determination of signal Emean. As an example, MP is equal to 4/16. Circuit 60 can be deactivated by setting MP to 1.

Circuit 50 comprises a subtractor 74 receiving signal PILOT and signal Emean and providing a signal Eprediction corresponding to the difference between signal PILOT and signal Emean, and thus to the difference between the last value of signal PILOT provided to circuit 50 and the mean value of signal PILOT.

Circuit 50 comprises a conventional circuit 76 for correcting signal Eprediction, also called a dynamic estimator. Circuit 76 for example is of predictor or interpolator type. Circuit 76 receives signal Emean and signal Eprediction and provides a signal Eestimate which corresponds to an estimate of signal Eprediction and a signal Echannel-estimate which corresponds to the sum of signal Emean and of signal Eestimate. Signal Echannel-estimate thus corresponds to an estimate of signal PILOT.

Figure 5:
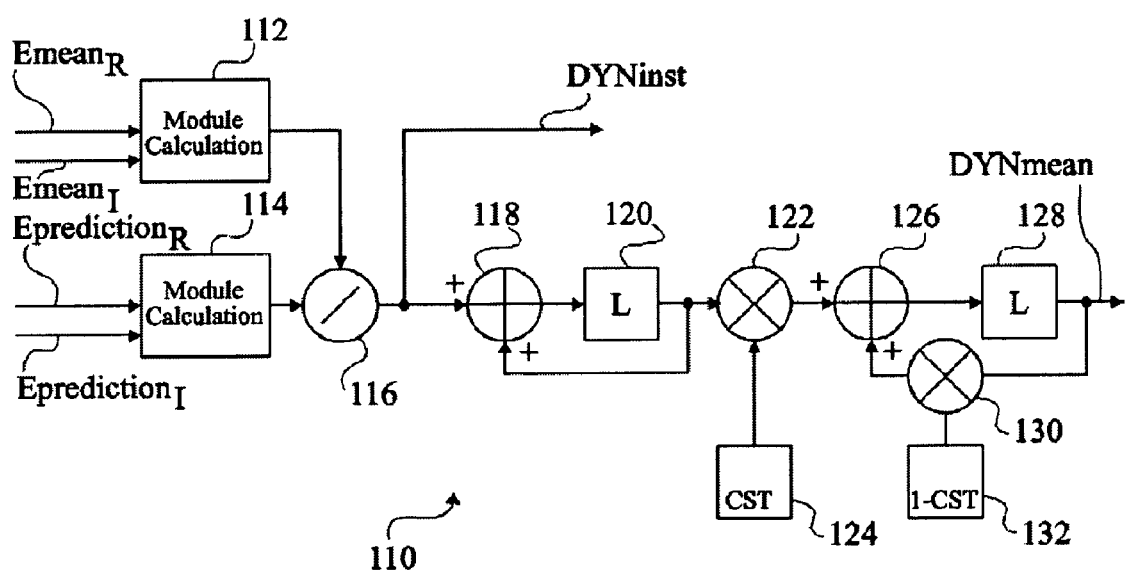
FIG. 5 shows an example of the forming of a unit for determining the type, fixed or variable along time, of the channel.

FIG. 5 shows an example of the forming of unit 110 for determining the fixed or time-variable type of the information channel. For this purpose, unit 110 determines an indicator representative of the fixed or time-variable type of the channel. Any variation of the indicator translates a time variation of the channel characteristics. For each successive symbol, and within a symbol, for each continuous and scattered pilot, unit 110 receives signals $Emean_R$ and $Emean_I$ which correspond to signal Emean respectively obtained from the real part and from the imaginary part of the complex coefficient associated with the considered pilot, and signals $Eprediction_R$ and $Eprediction_I$, which correspond to signal Eprediction respectively obtained from the real part and the imaginary part of the complex coefficient associated with the considered pilot. Signals $Emean_R$ and $Eprediction_R$ are provided by a same circuit 50 and signals $Emean_I$ and $Eprediction_I$ are provided by a same circuit 50. Signals $Emean_R$ and $Emean_I$ drive a circuit 114 for determining the modulus of the complex number Em having $Emean_R$ as a real part and $Emean_I$ as an imaginary part. Similarly, signals $Eprediction_R$ and $Eprediction_I$ drive a circuit 114 for determining the modulus of complex number Ep having $Eprediction_R$ as a real part and $Eprediction_I$ as an imaginary part. Since the determination of a modulus requires performing multiplication operations, it may be desirable to use an approximate value of the modulus of a complex number z, of real part a and of imaginary part b, given by the following relation:

$$modulus(z) = (d\max + 3/8 * d\min),$$

with $$d\min = \min(abs(a), abs(b)) \text{ and } d\max = \max(abs(a), abs(b))$$

where abs corresponds to the absolute value function, min corresponds to the minimum function, and max corresponds to the maximum function. It should be clear that the modulus of complex number Ep may be determined according to any technique known by those skilled in the art.

Unit 110 comprises a division unit 116 connected to circuits 112, 114 and providing a signal DYNinst corresponding to the ratio of the moduli of Ep and of Em. Signal DYNinst corresponds to an instantaneous indicator representative of a time variation of the frequency response of the channel for the considered pilot. Given that a division is performed at the level of unit 116, it is desirable to provide for circuit 112 to set the modulus of complex number Em at a minimum non-zero constant value, when the modulus is smaller than a determined threshold.

The output of unit 116 drives a first input of an adder 118 providing a signal stored in a latch 120. A second input of adder 118 is connected to the output of latch 120. When signals Emean$_R$, Emean$_I$, Eprediction$_R$, Eprediction$_I$ associated with the continuous and scattered pilots of a symbol have successively been transmitted to unit 116, the signal provided by latch 120 is equal to the sum of the instantaneous indicators associated with the continuous and scattered pilots of a symbol. Latch 120 drives a multiplication unit 122 capable of multiplying the signal provided by latch 120 by a gain CST stored in a memory 124. An adder 126 receives at a first input the signal provided by multiplication unit 122 and provides a signal stored in a latch 128. Latch 128 provides a signal DYNmean, corresponding to an averaged indicator, which is transmitted to a multiplication unit 130 multiplying signal DYNmean by a gain 1-CST stored in a memory 132, the result of the multiplication being provided to a second input of adder 126. Signal DYNmean thus corresponds to the time average of the sum of the instantaneous indicators. Gains CST and 1-CST correspond to the time constants used to determine the time average of the sum of the instantaneous indicators. As an example, gain CST is equal to 1/16.

Signal DYNmean being coded over a limited number of bits, it may be necessary to multiply signal DYNmean by a scale factor, which may depend on the type of demodulation used ("2K" or "8K" demodulation), especially to obtain an easily-interpretable numerical value.

The higher the instantaneous indicator DYNinst associated with a pilot, the more the channel frequency response varies along time with respect to the considered pilot. Conversely, the smaller the instantaneous indicator DYNinst associated with a pilot, the more constant the frequency response of the channel is along time with respect to the considered pilot.

The higher averaged indicator DYNmean, the more globally variable the channel frequency response is along time. Conversely, the smaller averaged indicator DYNmean, the more constant the channel frequency response is along time.

The values of the instantaneous and averaged indicators may be provided to various components of the demodulator to modify operating parameters of the demodulator. For example, according to the values of the instantaneous indicators and/or of the averaged indicator, the values of gains MP and of the coefficients used in the circuit 76 can be modified to privilege an estimate of the frequency response of the channel for the continuous or scattered pilots via average detection circuit 60 or circuit 76 of correction of unit 16. According to another example, the gains of the amplifiers provided upstream of analog-to-digital converter 10 may be modified according to the values of the instantaneous indicators and/or to the averaged indicator. According to another example, the time constants of the algorithms implemented by unit 14 may be adjusted according to the values of the instantaneous dynamism indicator and/or of the averaged indicator.

According to an alternative of the present invention, unit 110 for determining the fixed or time-variable type of the information channel receives signal Eestimate instead of signal Eprediction. Signal Eestimate is then used instead of signal Eprediction in the rest of unit 110 which is further identical to what has been described previously. Indeed, signal Eestimate, which corresponds to an estimate of signal Eprediction, has the same information content as signal Eprediction.

Of course, the present invention is likely to have various, alterations, improvements, and modifications which will readily occur to those skilled in the art. In particular, the detail of the processing of the continuous and scattered pilots is a non-limiting example only, and it is within the abilities of those skilled in the art to appropriately modify this processing.

Also, in the example of a demodulator of FIG. 5, all units may be modified or replaced with appropriate elements. For example, input E of the circuit may directly receive a signal centered on approximately 4.5 MHz. The analog-to-digital converter may be external to the demodulator.

The present invention has mainly been described in the context of the digital television radio transmission, defined by standard ETSI EN 300 744, V1.4.1. However, the present invention is neither limited to this standard, nor to this field, and may be applied in and to any device comprising a COFDM demodulator, be it a television receiver or not. For example, the demodulator according to the present invention may be used in a portable phone.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A COFDM demodulator comprising:

a fast Fourier transform circuit receiving a signal on an information channel, the received signal corresponding to a sequence of symbols comprising a series of symbols and a current symbol, each symbol of the sequence of symbols conveying several carriers, some of which are pilots, each of the pilots having been modulated in phase and in amplitude by a complex coefficient, said fast Fourier transform circuit extracting from each pilot a complex coefficient so that complex coefficients are extracted from a series of pilots and a current pilot, wherein the series of pilots and the current pilot correspond to a same portion of the information channel for different symbols in the sequence of symbols;

a circuit for determining at least a portion of a frequency response of the information channel by calculating a time average of real or imaginary parts of the complex coefficients extracted from the series of pilots and the current pilot to provide, for each pilot of a symbol of the sequence of symbols, an estimated complex coefficient, wherein the circuit for determining at least the portion of the frequency response comprises a circuit for providing, for each pilot of the symbol, a differential complex coefficient obtained based on a difference between the complex coefficient extracted from the current pilot and the estimated complex coefficient; and a circuit for calculating a time variation of the frequency response of the information channel based on the estimated complex coefficient and the differential complex coefficient associated with the current pilot, wherein
the circuit for calculating the time variation of the frequency response of the information channel comprises:
a circuit for providing a first value representative of a modulus of the estimated complex coefficient associated with the current pilot;
a circuit for providing a second value representative of a modulus of the differential complex coefficient associated with the current pilot; and
a circuit for providing an instantaneous indicator of the time variation of the frequency response of the information channel for the current pilot, corresponding to a ratio between the second value and the first value.

2. The demodulator of claim 1, wherein the circuit for calculating the time variation of the frequency response of the information channel comprises a circuit for determining a sum of the instantaneous indicators for all the pilots of a symbol.

3. The demodulator of claim 2, wherein the circuit for calculating the time variation of the frequency response of the information channel comprises a circuit for determining a mean indicator equal to a time average of the sum of the instantaneous indicators.

4. The demodulator of claim 3, comprising a correction circuit receiving the mean indicator and modifying an operating parameter of the demodulator according to the mean indicator.

5. A COFDM-type demodulation method comprising:
Fast Fourier transforming of a signal received from an information channel, the received signal corresponding to a sequence of symbols comprising a series of symbols and a current symbol, each of the symbols carrying several carriers, some of which are pilots, each of the pilots having been modulated in phase and in amplitude by a current complex coefficient, and extracting from each pilot a complex coefficient so that complex coefficients are extracted from a series of pilots and a current pilot, wherein the series of pilots and the current pilot correspond to a same portion of the information channel for different symbols in the sequence of symbols;
determining an estimated complex coefficient representing at least a portion of a frequency response of the information channel in a unit having a storage by calculating and storing a time average of real or imaginary parts of the complex coefficients extracted from the series of pilots and the current pilot; and
calculating a time variation of the frequency response of the information channel, based on the estimated complex coefficient and on a current complex coefficient associated with the current pilot, wherein
calculating the time variation of the frequency response of the information channel comprises:
determining a first value representative of a modulus of the estimated complex coefficient associated with the pilot;
determining a second value representative of a modulus of a differential complex coefficient obtained from a difference between the complex coefficient extracted from the current pilot and the estimated complex coefficient; and
determining an instantaneous indicator of the time variation of the frequency response of the information channel for the current pilot, corresponding to a ratio between the second value and the first value.

6. The method of claim 5, wherein calculating the time variation of the frequency response of the information channel comprises determining a sum of the instantaneous indicators for all the pilots of a symbol.

7. The method of claim 6, wherein calculating the time variation of the frequency response of the information channel comprises determining a time average of the sum of the instantaneous indicators.

8. A demodulator comprising:
a receiver to receive a first signal of an information channel, the first received signal corresponding to a sequence of symbols comprising a series of symbols and a current symbol, each of the symbols carrying several carriers, some of which are pilots, each of the pilots having been modulated in phase and in amplitude by a complex coefficient, and to extract from each of the pilots a complex coefficient, wherein the pilots correspond to a same portion of the information channel for different symbols in the plurality of symbols; and
a channel determination unit comprising:
an averaging unit to determine a time average of real components and imaginary components of the pilots;
an estimator unit to determine an estimated complex coefficient representing a frequency response of the information channel based on the time average of the real components and imaginary components of the pilots, wherein the complex coefficient comprises real and imaginary components; and
a calculation unit that calculates a time variation of the frequency response of the information channel based on the time average of the real components and imaginary components of the pilots and the estimated complex coefficient, wherein the calculation unit comprises:
a first modulus calculation unit that calculates a modulus of the time average, and
a second modulus calculation unit that calculates a modulus of the estimated complex coefficient.

9. The demodulator of claim 8, further comprising a suppressor unit for suppressing pulse interferences in the first signal.

10. The demodulator of claim 8, further comprising:
a Fourier transform circuit that receives the first signal; and
an control circuit that controls the Fourier transform circuit based the plurality of pilots.

11. The demodulator of claim 10, further comprising:
an inverse fast Fourier transform circuit for determining a channel pulse response, wherein an operating window of the Fourier transform circuit is adjusted based on the channel pulse response.

12. The demodulator of claim 8, further comprising a demapping unit and an error correction unit.

13. The demodulator of claim 8, further comprising an analog-to-digital converter to digitize the first signal.

14. The demodulator of claim 8, wherein the time variation is calculated by dividing the modulus of the estimated complex coefficient by the modulus of the time average.

15. The demodulator of claim 8, wherein the averaging unit determines time averages of each one of the plurality of pilots, wherein the estimator unit determines estimated complex coefficients for each one of the plurality of pilots, and wherein the calculation unit calculates time variations of the frequency response of the information channel based on the time averages and the estimated complex coefficients for each one of the plurality of pilots.

* * * * *